350-171
10/31/78    SR
            OR    4,123,143

United States Patent [19]
Yachin et al.

[11] 4,123,143
[45] Oct. 31, 1978

[54] LASER BEAM ALIGNING APPARATUS

[75] Inventors: Ami Yachin, Herzlia; Baruch Gozhansky, Raanana, both of Israel

[73] Assignee: Laser Industries Ltd., Tel Aviv, Israel

[21] Appl. No.: 744,422

[22] Filed: Nov. 23, 1976

[30] Foreign Application Priority Data

Nov. 27, 1975 [IL] Israel ........................................ 48554

[51] Int. Cl.$^2$ ............................................. A61B 17/36
[52] U.S. Cl. ................................. 350/171; 128/303.1
[58] Field of Search ....................... 128/303.1; 350/171

[56] References Cited
U.S. PATENT DOCUMENTS

| | | | |
|---|---|---|---|
| 3,096,767 | 7/1963 | Gresser et al. | 128/303.1 |
| 3,769,963 | 11/1963 | Goldman et al. | 128/303.1 |
| 3,828,788 | 8/1974 | Krasnov et al. | 128/303.1 |
| 3,913,582 | 10/1975 | Sharon | 128/303.1 |

*Primary Examiner*—John K. Corbin
*Assistant Examiner*—R. A. Rosenberger
*Attorney, Agent, or Firm*—Benjamin J. Barish

[57] ABSTRACT

Apparatus for aligning a working laser beam with respect to a working area comprises a manipulatable guide having a hand manipulator including a focussing lens for manipulating and focussing the beam on the working area; and a laser generating a low-energy visible laser beam which is directed through the guide and focussing manipulator with the working laser beam. The low-energy laser beam has a divergence angle not substantially greater than that of the working laser beam and includes sections on opposite sides of and equally spaced from the center of the working laser beam such that the focal point of the sections of the low-energy laser beam, when focussed to a single point by the focussing lens, also designates the focal point of the working laser beam.

5 Claims, 8 Drawing Figures

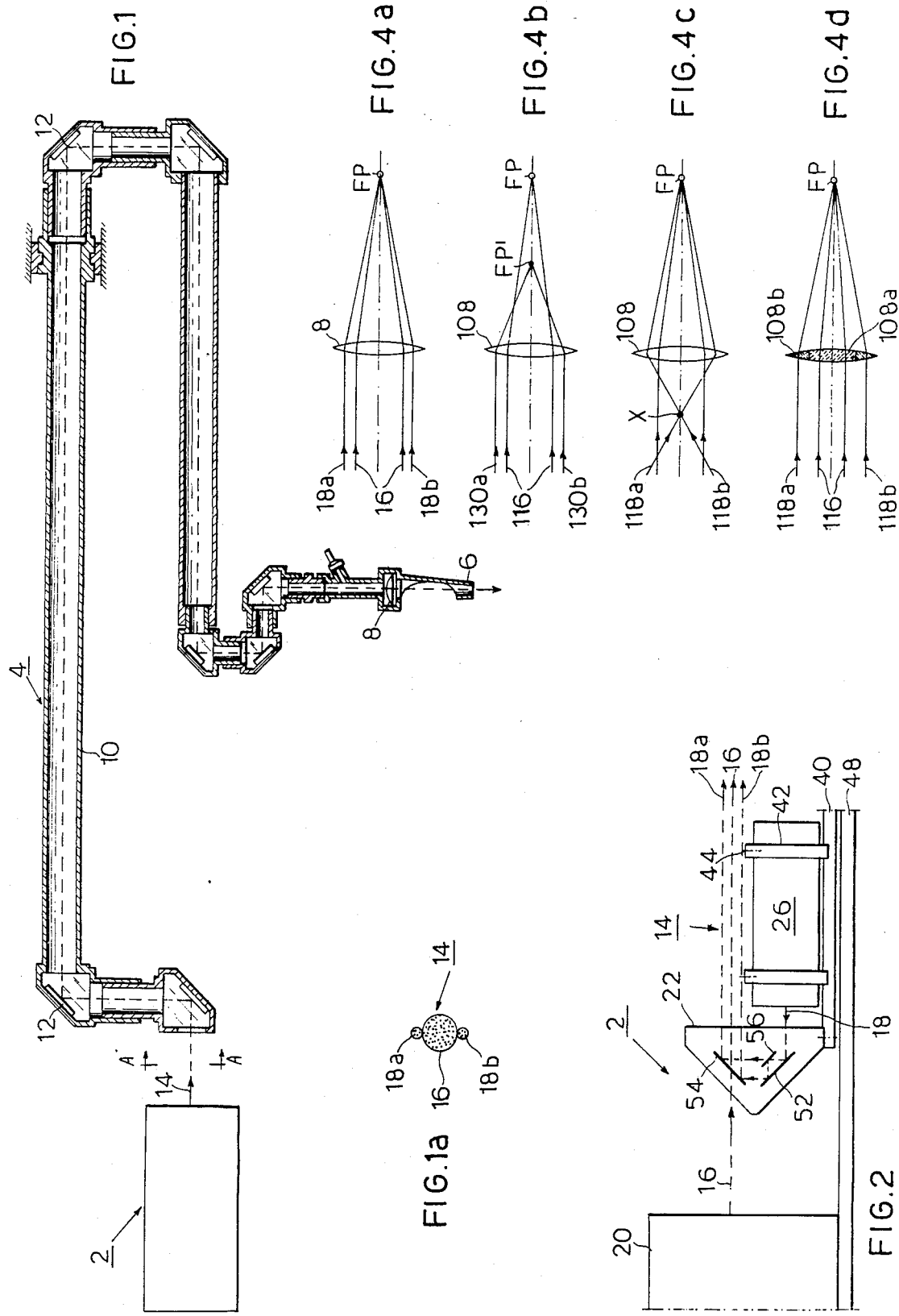

LASER BEAM ALIGNING APPARATUS

BACKGROUND OF THE INVENTION

The present invention relates to laser beam aligning apparatus. It is particularly useful with respect to manipulatable laser beam apparatus used as laser surgical scalpels, and is therefore described below in connection with that application.

As is well known, a laser beam can be focussed to a very small spot (e.g. 100 microns or less in diameter) to produce an extremely hot concentration of light energy. At laser wavelengths (e.g., 10.6 microns), the laser energy is almost completely absorbed by body tissues, and therefore a focussed laser beam may be used to cut through most types of tissues by burning or vaporizing. One of the important advantages of using a laser beam for this purpose is that it makes clean and fine cuts while minimizing damage to tissues outside the cutting lines. Also, the laser beam readily coagulates capillaries, small veins, and small arteries, thereby minimizing loss of blood and keeping the working area clean. Because of these and other advantages, manipulatable leaser beams are increasingly coming into use as surgical scalpels.

One problem in using laser beams as surgical scalpels is the difficulty in precisely aligning the focussed beam on the spot or along the line of the cut during the time the operation is being performed. This is because of the invisible nature of such beams and also because of the high concentration of energy included in them. Various arrangements have been proposed to solve this problem. One proposed arrangement includes two external light sources that project two light beams which intersect at the focal point of the laser beam. Another proposed arrangement includes a reflector which intersects a portion of the laser beam and transmits it to a sighting member, the field of the sighting member being transposed onto the field of the target as viewed via an eyepiece. Such arrangements, however, are not entirely satisfactory with respect to the precision and the convenience of alignment and manipulation required by a surgeon in performing delicate surgical operations.

SUMMARY OF THE INVENTION

According to a broad aspect of the present invention, there is provided apparatus for aligning a working laser beam with respect to a working area, comprising: a manipulatable guide for receiving the working laser beam and for guiding same to the working area; focussing means for focussing the laser beam to a focal point on the working area; a laser generating a low-energy visible laser beam; and means for directing the low-energy laser beam into and through the guide and focussing means with the working laser beam. The guide comprises an articulated structure having beam redirecting means at the articulations, and a hand manipulator including the focussing means for manipulating the focussd beam on the working area. The low-energy laser beam is one which has a divergence angle not substantially greater than that of the working laser beam and includes sections on opposite sides of and equally spaced from the centre of the working laser beam as both beams enter the manipulatable guide, such that the focal point of the sections of the low-energy laser beam, when focussed to a single point by the focussing means, designates the focal point and focal depth of the working laser beam. The laser generating the low-energy laser beam generates a single visible laser beam, the apparatus including an optical device for forming said latter beam to include beam sections on opposite sides of the working laser beam as it enters and travels therewith through the articulations of the manipulatable guide and the focusing means.

Since the low-energy visible laser beam has a divergence angle not substantially greater than that of the working laser beam, it will be appreciated that even though both beams travel over relatively long distances (the linear length of the laser guide being in the order of 2.5 meters for example), the focussing of the visible laser beam sections will also indicate the focal point of the working laser beam, so that as the surgeon moves the manipulator and views the focal point of the visible laser beam he is kept continuously apprised of the focal point of the working laser beam even though that beam is not yet actuated. In addition, he is also apprised of the focal depth of the beam, i.e., the distance along the beam axis of the plane of impingement of the beam from the focal plane.

According to an important feature of the present invention, the low-energy laser beam is split into the two sections on opposite sides of the working laser beam by a beam splitting device which includes a pair of mirrors and a beam-splitter between the two, one mirror being oriented to direct the visible laser beam to impinge the beam-splitter, and the beam-splitter being oriented to transmit a portion of the impinged visible beam to the second mirror and to reflect another portion back to the first mirror. The latter portion of the visible beam is reflected by the first mirror to the second mirror along a path which is spaced from and substantially parallel to that of the first portion of the beam transmitted by the beam splitter to the second mirror. The second mirror transmits the working laser beam through it and is oriented to reflect the two visible beam portions to two paths equally spaced on opposite sides of the working laser beam.

An important advantage in the foregoing arrangement is that, since the wave length of the low-energy visible laser beam and the working laser beam are different, they will not be focussed exactly the same by the focussing means. The above-described beam-splitting arrangement for producing the two portions of the visible laser beam on opposite sides of the working laser beam include adjustable mounting means permitting the mirrors to be adjusted to cause the two portions of the visible laser beam to converge and to intersect at a point ahead of the focussing means, and thereby to converge and intersect at the focal point of the working laser beam behind the focussing means.

Further features and advantages of the invention will be apparent from the description below.

BRIEF DESCRIPTION OF THE DRAWINGS

The invention is herein described, by way of example only, with reference to the accompanying drawings, wherein:

FIG. 1 is a diagrammatic layout of a laser beam manipulating apparatus constructed in accordance with the invention, FIG. 1a illustrating the composite-beam cross-section along line A-A at the inlet side of the articulated guide structure;

FIG. 2 illustrates the arrangement for producing the composite working-laser and visible-laser beams at the inlet of the articulated guide structure in FIG. 1;

FIG. 4a is a diagram illustrating how the low-energy visible beam sections are focussed to substantially the same focal point as the high-energy invisible laser beam, assuming the wave-lengths of the two beams are substantially equal;

FIG. 4b is a diagram illustrating what occurs if their wavelengths are not sufficiently close so that they are focussed to the same focal point; and FIGS. 4c and 4d are diagrams illustrating two arrangements that may be used where the wavelengths of the twolaser beams are significantly different.

DESCRIPTION OF THE PREFERRED EMBODIMENT

Figure 3:
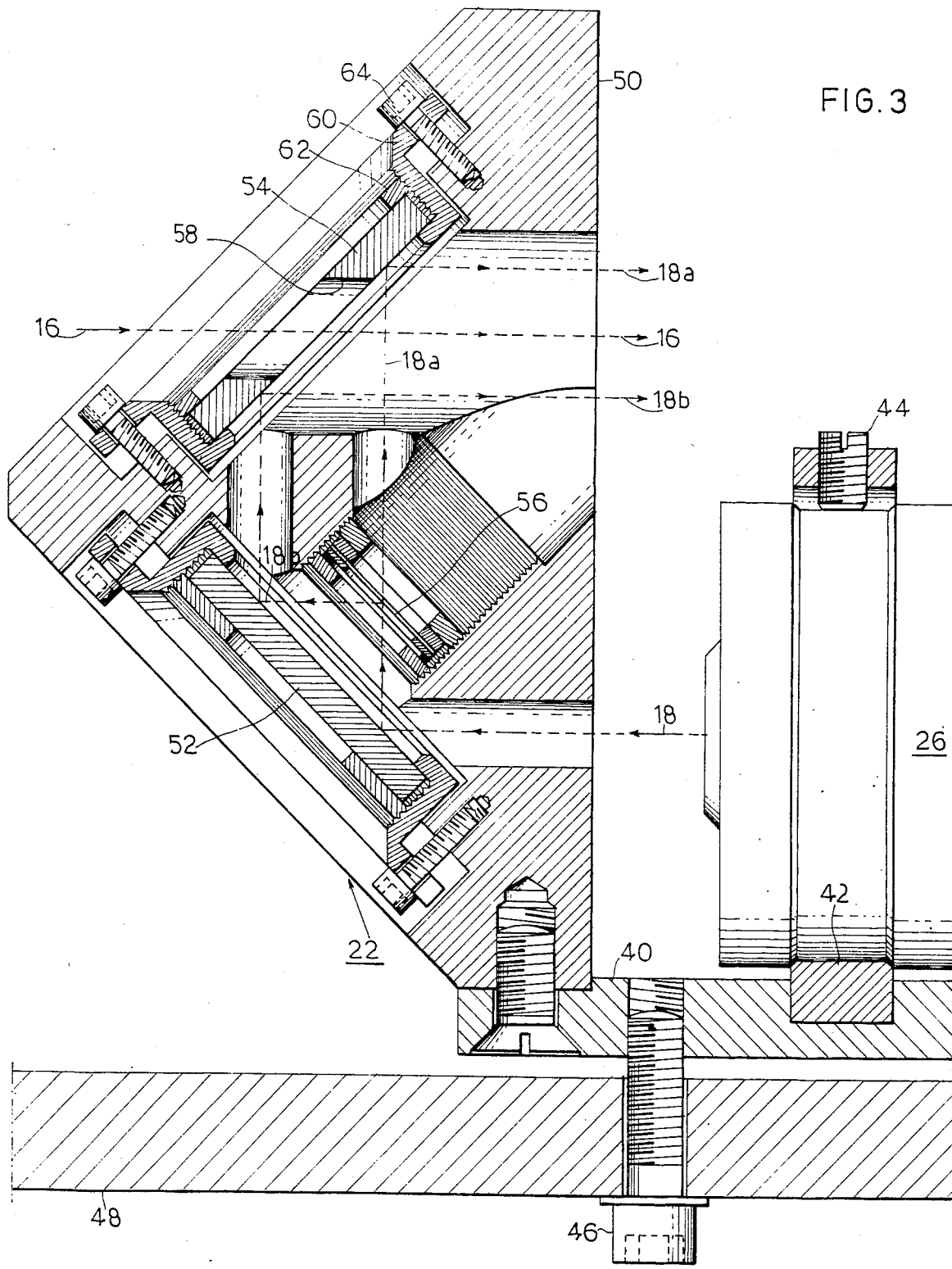
FIG. 3 is an enlarged detailed view illustrating the optical device for splitting the visible laser beam into two beam sections and for producing therewith and with the working laser beam the composite beam introduced into the articulated guide structure of FIG. 1.

With reference first to FIG. 1, there is shown a laser beam manipulator of the type described in U.S. Pat. No. 3,913,582 particularly useful as a laser surgical scalpel. It includes means for generating the laser beam, schematically designated by box 2, and an articulated guide structure, generally designated 4, for guiding the laser beam to a hand manipulator 6, the latter including a focussing lens 8 for focussing the laser beam on the working area. The articulated guiding structure 4 is formed of a plurality of hollow sections, (e.g. 10) pivotably and rotatably mounted to each other, and including mirrors 12 at the points of articulation to redirect the beam so as to guide same within the guiding structure 4 until it exits from the end of hand manipulator 6 after being focussed by lens 8.

According to the illustrated embodiment of the present invention, the laser unit 2 includes not only the high-energy working laser, but also an additional, low-energy laser producing a visible beam. The beam 14 thus exiting from the unit 2 is a composite beam including a high-energy working portion 16(FIG. 1a) and low-energy visible portions 18a, 18b.

This is more particularly illustrated in FIG. 2, wherein the unit generally designated 2 in FIG. 1 includes a first laser 20 producing the high-energy working laser beam 16 which passes through an optical device 22, and a second laser 26 producing a single low-energy visible laser beam 18 which enters optical device 22 and exits therefrom in the form of the two beam sections 18a, 18b travelling in parallel paths close to and equally spaced on each side of the working laser beam 16 (FIG. 1a). It is this composite beam, designated 14 in FIG. 1, which enters the articulated guiding structure 4 and exits therefrom at the hand manipulator end 6 after being focussed by lens 8.

The smaller laser 26 is selected to produce a beam 18 having a divergence angle not substantially greater than that of beam 16 from the working laser 20 so that these beams remain substantially parallel to each other irrespective of the distance they travel (e.g. about 2½ meters) before they enter focussing lens 8 where they are focussed to a point. Thus, the specific point at which the two visible beam sections 18a, 18b are focussed to a fine spot will also be the focal point of the working laser beam 16, and by observing this visible spot, the surgeon is continuously apprised of the focal point of the working laser beam 16 even when that laser is not energized.

The optical unit generally designated 22 in FIG. 2 is more particularly illustrated in FIG. 3. It comprises a plate 40 supporting the low-energy visible laser 26 secured thereto by means of a ring 42 and a screw 44 at each end of the laser. Plate 40 is in turn secured, by means of screws 46, to a base 48 which also supports the high-energy working laser 20.

Optical unit 22 includes a housing 50 supporting a first mirror 52, a second mirror 54, and a beam-splitter 56. Mirror 52 is oriented at 45° to the beam 18 exiting from laser 26 so as to reflect that beam at right angles thereto (i.e., in the vertical direction of FIG. 3) wherein it impinges the beamsplitter 56. The latter is also oriented at 45° to the axis of laser 26 i.e., parallel to mirror 52, and splits the beam into two sections, namely a first second 18a which is transmitted through the beam splitter to the upper part of the second mirror 54, and a second section 18b which is reflected back to the first mirror 52, the latter reflecting the beam section to the lower part of mirror 54. Mirror 54 is disposed also at 45° to the axis of laser 26 so as to reflect the two beam sections 18a, 18b to a parallel spaced relationship with respect to the original laser beam 18 (i.e. in the horizontal plane, FIG. 3) but in the opposite direction.

Mirror 54 is formed with a central opening 58 through which passes the high-energy beam 16 from the working laser 20. The latter beam thus exits from optical splitting device 22 exactly midway between the two visible beam sections 18a, 18b and substantially parallel to them, as shown in FIG. 1a; and this composite beam (shown as 14 in FIG. 1) enters the inlet side of the articulated guide structure 4.

This substantially parallel relationship of the two low-energy visible laser beam sections 18a, 18b with the high-energy working beam 16 is maintained as the composite beam is guided through the articulated guide structure 4, until it reaches the focussing lens 8 at the hand manipulator end 6. Lens 6 focusses the working beam 16 substantially the same as the visible beam sections 18a, 18b, so that when the latter are focussed to a fine spot as indicated above, that spot will also indicate the focal point of the working laser beam 16. Thus, the surgeon may focuss the visible beam sections while the working beam is unenergized, and once the focus point has been determined, the working beam may be energized.

The two mirrors 52, 54, and the beam splitter 56, each includes an annular holder 60, a retaining ring 62, and a plurality of threaded pins 64 permitting adjustment of the unit with respect to the housing 50.

The diagram of FIG. 4a illustrates how the low-energy laser beam sections 18a, 18b are focussed by the focussing lens 8 to a common focal point FP, which also constitutes the focal point of the high-energy invisible laser beam 16. This diagram is true when the wavelengths of the two laser beams are substantially close to each other so as to be focussed at substantially the same focal point.

In some cases, it may be desirable to use a low-energy laser beam having a wavelength substantially different from that of the high-energy beam. Such a situation is diagrammatically illustrated in the diagram of FIG. 4b, wherein it will be seen that the low-energy laser beam sections 118a, 118b, although travelling parallel to the high-energy beam 116 to the focussing lens 108, are refracted to a different focal point FP' than the focal point FP of the high-energy laser beam 116 because of the significant difference in the wavelengths between the two laser beams. FIGS. 4c and 4d illustrate two arrangements that may be used for correcting this.

Thus, as shown in FIG. 4c, the two low-energy laser beam sections 118a, 118b are caused to intersect at a point "X" ahead of the focussing lens 108. This intersection point can be adjusted (e.g., by adjusting mirrors 52, 54 the threaded pins 64, FIG. 3) so as to bring the intersection point behind the focussing lens 108 to coincide with the focal point FP of the high-energy laser beam 116. FIG. 4d illustrates a second possible arrangement, wherein the focussing lens 108 includes two sections, namely a central section 108a for refracting the high-energy laser beam 116, and an outer annular section 108b for refracting the low-energy visible beam sections 118a, 118b, the indices of refraction of the two sections being selected in regard to the wavelengths of the two laser beams so as to bring both to a common focal point FP.

As one example, the low-energy visible-beam laser 20 may be a He-Ne laser, the high-energy working-beam laser may be a $CO_2$ laser, mirror 52 may be gold plated, and mirror 54 may be of stainless steel formed with a central opening 58. Many variations are apparent, however. For example, mirror 54 could be of germanium which is transparent to the $CO_2$ laser beam but reflective to the He-Ne laser beam. In addition, instead of splitting the low-energy visible laser beam into two circular sections, one on each side of the high-energy working laser beam, the low-energy beam could be formed of doughnut-shape with the high-energy beam passing through its centre, so that focussing the low-energy beam to a spot also indicates the focal point of the high-energy beam. Further, while the invention has been described with respect to a laser surgical scalpel, it will be appreciated that it could be advantageously used in other applications, such as precision welding and the like.

What is claimed is:

1. Laser apparatus particularly useful for freehand aligning of a working laser beam with respect to a working area, comprising: a first laser generating a high-energy working laser beam; a second laser generating a low-energy visible laser beam having a divergence angle not substantially greater than that of the working laser beam; a manipulatable guide device including a hand manipulator and focussing means for manipulating the working laser beam and for focussing same on the working area; and a beam splitting device oriented to receive said visible laser beam and to split same into sections disposed on opposite sides of the working laser beam as both beams enter the manipulatable guide device; said beam splitting device comprising a first mirror, a second mirror, and a beam-splitter; the first mirror being oriented to direct the visible laser beam to impinge the beam splitter; the beam splitter being oriented to transmit a portion of the impinged visible beam to said second mirror, and to reflect another portion thereof back to said first mirror, the latter portion of the visible beam being reflected by the first mirror to the second mirror along a path which is spaced from and substantially parallel to that of the first portion of the beam transmitted by the beam splitter to the second mirror; the second mirror transmitting the working laser beam therethrough and being oriented to reflect the two visible beam portions to paths equally spaced on opposite sides of the working laser beam.

2. Apparatus according to claim 1, wherein said second mirror has an opening for transmitting the working laser beam therethrough.

3. Apparatus according to claim 1, wherein said second mirror is transparent to the working laser beam but reflective to the low-energy laser beam.

4. Apparatus according to claim 1, wherein the wavelengths of said low-energy laser beam and said working laser beam are substantially different, said focussing means including separate sections for each of said beams such as to focus both to substantially the same focal point.

5. Apparatus according to claim 1, wherein the wave lengths of said low-energy visible laser beam and said working laser beam are different such that they are not focussed exactly the same by said focussing means, said first and second mirrors of the beam splitting device being mounted by adjustable means permitting the mirrors to be adjusted to cause the two portions of the visible laser beam to converge and to intersect at a point ahead of the focussing means and thereby to converge and intersect at the focal point of the working laser beam behind the focussing means.

* * * * *